United States Patent
Bliley et al.

(10) Patent No.: US 7,102,801 B2
(45) Date of Patent: Sep. 5, 2006

(54) PULSE-WIDTH MODULATED DRIVERS FOR LIGHT-EMITTING UNITS OF SCANNING MECHANISM

(75) Inventors: Paul D. Bliley, Vancouver, WA (US); William Eaton, Vancouver, WA (US); William D. Meyer, Ramona, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 10/424,497

(22) Filed: Apr. 26, 2003

(65) Prior Publication Data

US 2004/0212847 A1 Oct. 28, 2004

(51) Int. Cl.
*H04N 1/46* (2006.01)

(52) U.S. Cl. .................. 358/509; 358/505; 358/475

(58) Field of Classification Search .............. 358/509, 358/512–514, 505, 506, 475, 482, 483, 474, 358/497; 250/226, 208.1, 234–236, 216, 250/227.2, 578.1; 362/800, 230, 231, 611–613; 315/291, 300, 312; 382/312, 318, 319; 399/220, 399/4, 211, 212
See application file for complete search history.

(56) References Cited

U.S. PATENT DOCUMENTS

| | | | |
|---|---|---|---|
| 4,390,882 A | | 6/1983 | Ohara et al. ............. 347/253 |
| 4,806,946 A | | 2/1989 | Ohnishi ................... 347/252 |
| 5,291,307 A | * | 3/1994 | Luckhurst ................. 358/446 |
| 5,363,208 A | | 11/1994 | Ogino et al. ............. 358/3.02 |
| 5,909,246 A | | 6/1999 | Terashima ............... 348/298 |
| 6,016,038 A | * | 1/2000 | Mueller et al. ........... 315/291 |
| 6,094,689 A | * | 7/2000 | Embry et al. ............... 710/5 |
| 6,448,550 B1 | * | 9/2002 | Nishimura ............... 250/226 |
| 6,545,777 B1 | * | 4/2003 | Amimoto ................ 358/509 |
| 6,785,026 B1 | * | 8/2004 | Terajima et al. .......... 358/509 |
| 6,806,659 B1 | * | 10/2004 | Mueller et al. .......... 315/295 |
| 6,839,864 B1 | * | 1/2005 | Mambakkam et al. ...... 714/5 |
| 6,867,757 B1 | * | 3/2005 | Nakamura ................ 345/83 |
| 6,917,028 B1 | * | 7/2005 | Hiromatsu .............. 250/208.1 |

OTHER PUBLICATIONS

"Introduction to Pulse Width Modulation," Michael Barr, Aug. 31, 2001, http://www.embedded.com/story/OEG20010821S0096.
European Search Report dated Nov. 11, 2005.

* cited by examiner

*Primary Examiner*—Cheukfan Lee

(57) ABSTRACT

A scanning mechanism of one embodiment of the invention is disclosed that includes light-emitting units, an integrating detector, and pulse-width modulated (PWM) drivers. Each light-emitting unit can emit colored light corresponding to a color of a color space. The integrating detector can detect the colored light emitted by the light-emitting units as reflected off a surface by integrating the colored light detected over a period of time. Each PWM driver can turn on a corresponding light-emitting unit at a duty cycle.

28 Claims, 7 Drawing Sheets

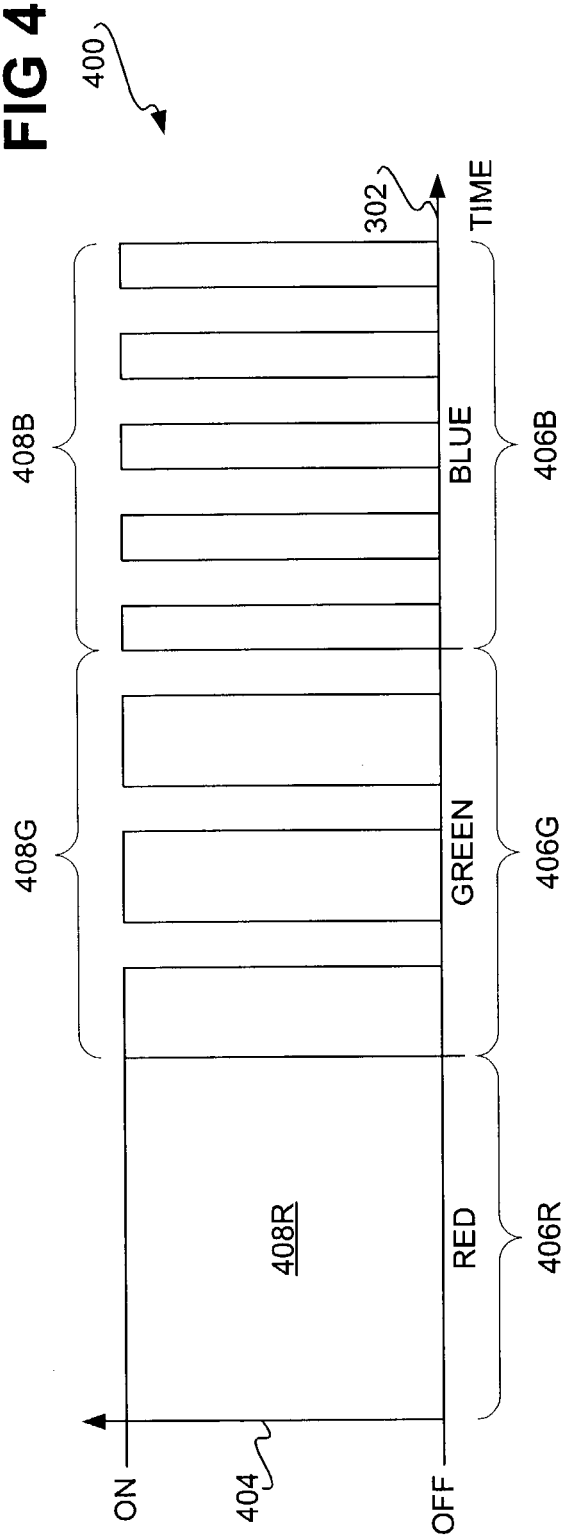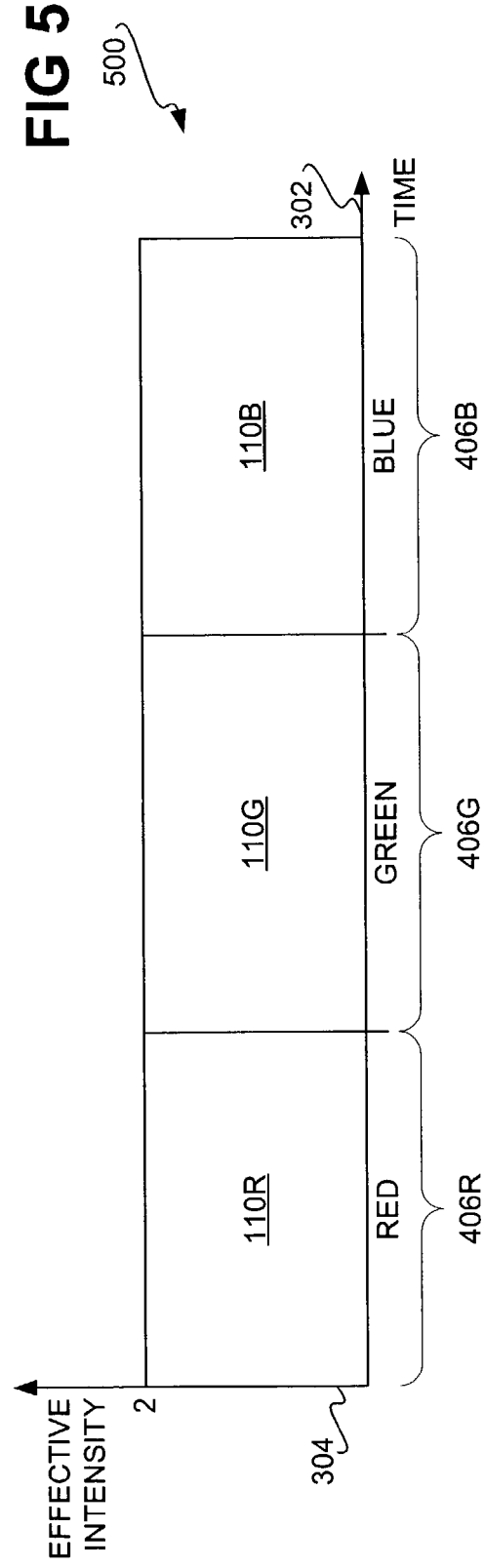

PULSE-WIDTH MODULATED DRIVERS FOR LIGHT-EMITTING UNITS OF SCANNING MECHANISM

BACKGROUND

Scanning devices, also known as scanners, have become popular peripherals. A scanning device may be used to obtain an electronic version of a non-electronic image. For instance, a home user may scan a hardcopy of a photograph so that the user can email the resulting electronic version of the photo to friends and family. As another example, business users may scan hardcopies of documents so that electronic versions of the documents can be maintained.

Scanning devices typically employ one or more light-emitting units and a detector. The light-emitting units emit light on a portion of the image to be scanned. The detector detects the reflected light from the portion of the image. This process is repeated over the entire image. When the detector has detected reflected light from all the portions of the image, an electronic version of the media can then be constructed.

A color scanning device usually uses light-emitting units corresponding to the colors of a color space, such as red, green, and blue light-emitting units corresponding to the colors red, green, and blue of the red-green-blue (RGB) color space. The light-emitting units separately and successively emit their colored lights onto a portion of the image, which the detector detects. The detected intensities of the individual colors of the color space for the image are then used to construct an electronic version of the image.

Differently colored light-emitting units may have different operating characteristics. For instance, the red, green, and blue light-emitting units may emit light at different intensities. In addition, the scanning device may sense the different colors in the color space differently. Thus, even if the red, green, and blue light-emitting units emit light at equal intensities, the scanning device may sense the different colored light differently, such that the measured intensities are not equal.

SUMMARY OF THE INVENTION

A scanning mechanism of one embodiment of the invention includes light-emitting units, an integrating detector, and pulse-width modulated (PWM) drivers. Each light-emitting unit can emit colored light corresponding to a color of a color space. The integrating detector can detect the colored light emitted by the light-emitting units as reflected off a surface by integrating the colored light detected over a period of time. Each PWM driver can turn on a corresponding light-emitting unit at a duty cycle.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

FIG. 4 is a graph of the pulses sent to light-emitting units based on values stored within PWM control registers to turn on and off the light-emitting units, according to an embodiment of the invention.

FIG. 5 is a graph of the light emitted by the light-emitting units over periods of time as controlled by the pulses of the graph of FIG. 4, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Scanning Mechanism with Pulse-width Modulated (PWM) Drivers

Figure 1:
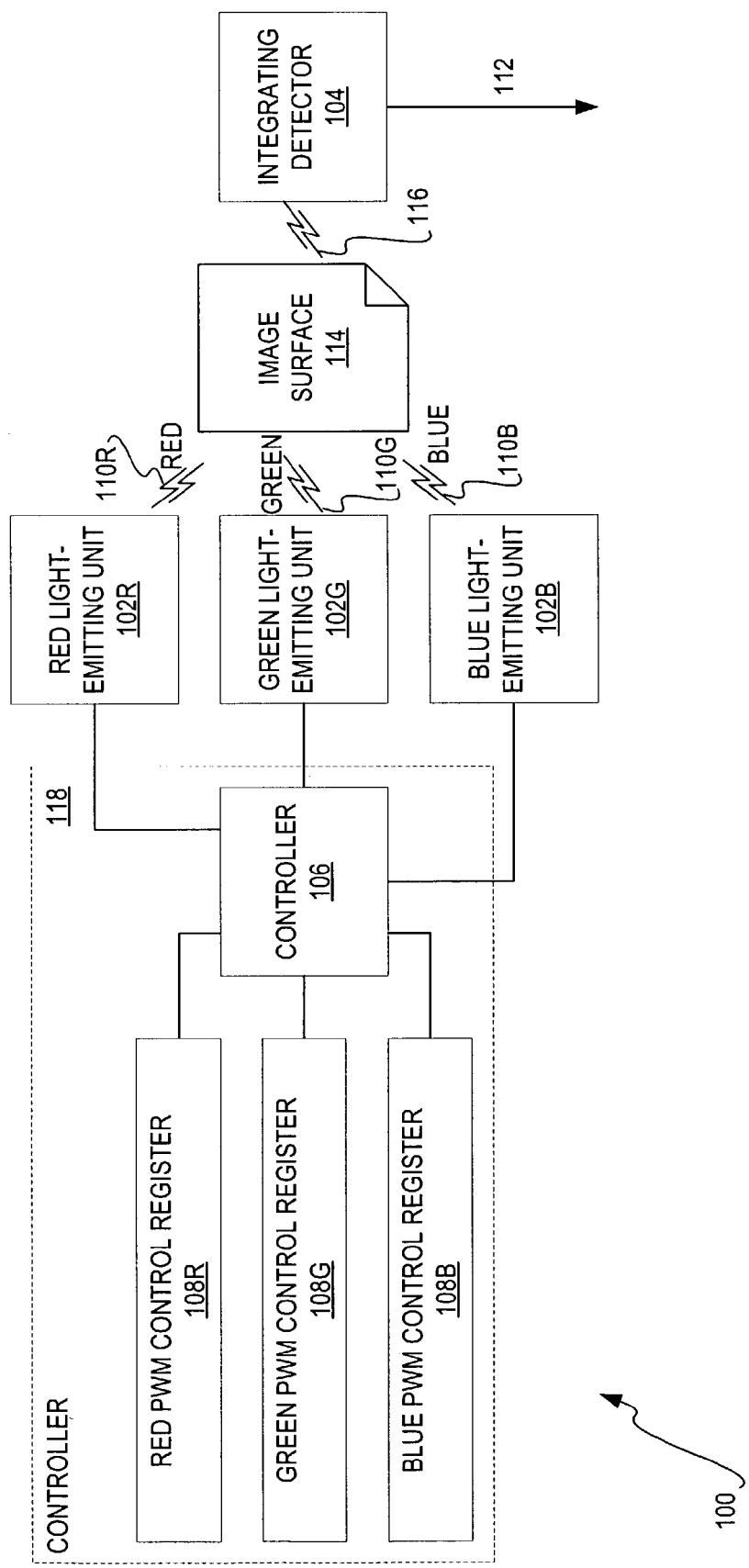
FIG. 1 is a diagram of a scanning mechanism having pulse-width modulated (PWM) drivers, according to an embodiment of the invention.

FIG. 1 shows a scanning mechanism 100 with pulse-width modulated (PWM) drivers 118, according to an embodiment of the invention. The scanning mechanism 100 includes light-emitting units 102, an integrating detector 104, and the PWM drivers 118. The scanning mechanism 100 is specifically depicted in FIG. 1 as having light-emitting units 102 and PWM drivers 118 for a red-green-blue (RGB) color space. The light-emitting units 102 thus include a red light-emitting unit 102R emitting red colored light 110R, a green light-emitting unit 102G emitting green colored light 110G, and a blue light-emitting unit 102B emitting blue colored light 110B. The PWM drivers 118, including a controller 106 and PWM control registers 108, likewise include a red PWM control register 108R, a green PWM control register 108G, and a blue PWM control register 108B.

As can be appreciated by those of ordinary skill within the art, the color space for which the scanning mechanism 100 is designed may be a color space other than the RGB color space. For example, the scanning mechanism 100 may be a grayscale, or black-and-white scanning mechanism. There may thus be a single one of the light-emitting units 102 that outputs white light, which corresponds to the white color of the grayscale or black-and-white color space.

The light-emitting units 102 may be light-emitting diodes (LED's) of their respective color, or another type of light-emitting unit. For instance, the light-emitting units 102 may include white light-emitting units that have appropriately colored filters thereover to emit their respective colored light. As another example, the light-emitting units 102 may include a single light-emitting unit, with a rotating filter having different colors so that differently colored light is emitted at different times. Furthermore, the light-emitting units 102 when turned on may emit their respective colored light with different actual intensities.

Figure 2:
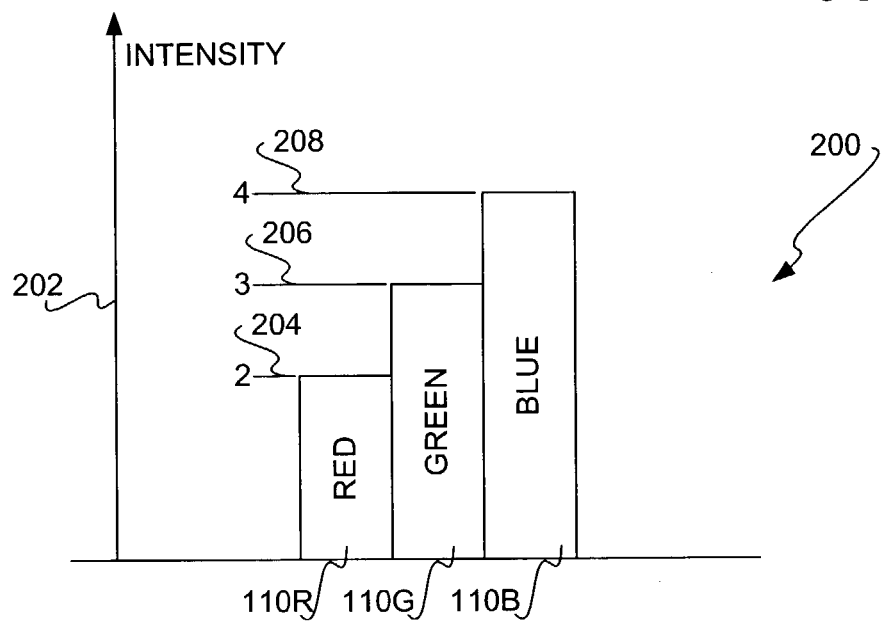
FIG. 2 is a bar chart showing how light-emitting units emit colored light of different intensities, according to an embodiment of the invention.

FIG. 2 depicts a bar chart 200 illustrating a simplified example in which the light-emitting units 102 of FIG. 1 emit colored light 110 of different intensities, according to an embodiment of the invention. The arrow 202 represents increasing light intensity. Thus, the red light 110R has a relative intensity of two, as indicated by the line 204. The green light 110G has a relative intensity of three, as indicated by the line 206, whereas the blue light 110B has a relative intensity of four, as indicated by the line 208. This means that the intensity of the green light 110G is 50% brighter than the intensity of the red light 110R, and the intensity of the blue light 110B is 100% brighter than the intensity of the red light 110R.

Referring back to FIG. 1, when any of the light-emitting units 102 emit their respective light 110, it is reflected off an image surface 114 as the reflected light 116. The integrating detector 104 detects the reflected light 116, and in response provides an output 112 representative of the intensity of reflect light 116 as integrated over a given time period. The output 112 may be analog or digital. The integrating detector 104 may be or include a bipolar junction transistor (BJT), or another type of transistor.

Figure 3:
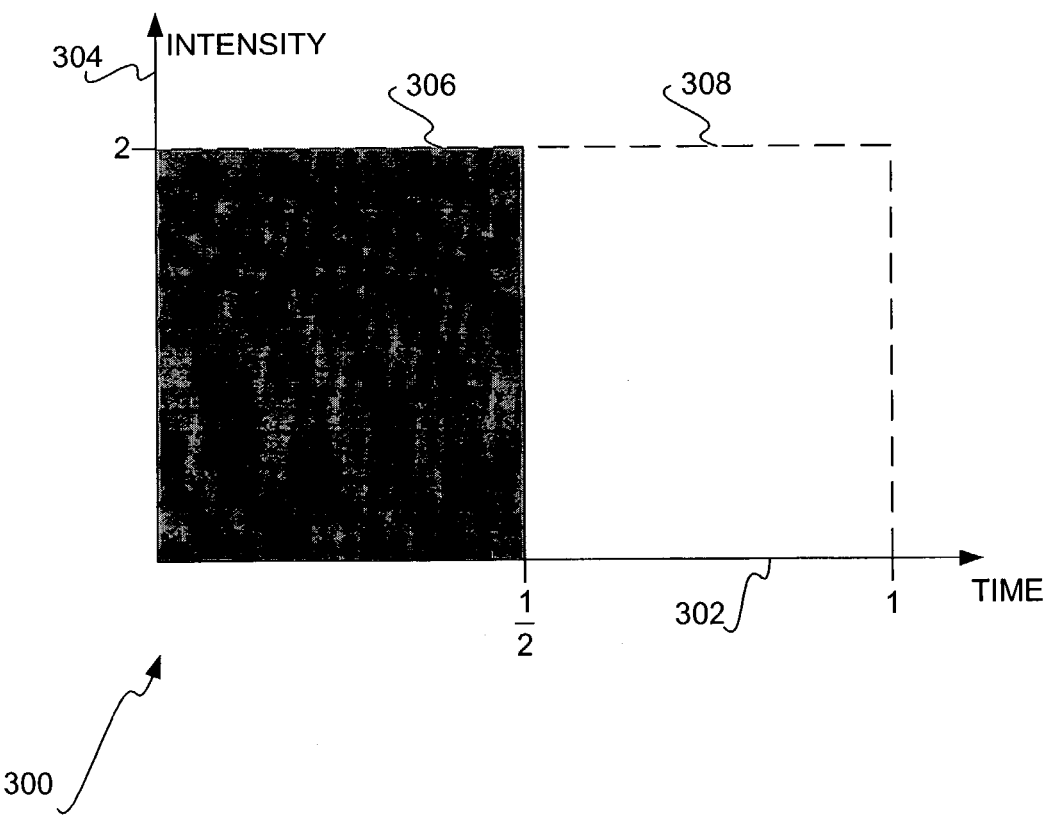
FIG. 3 is a graph of the light detected by an integrated detector over a period of time, according to an embodiment of the invention.

FIG. 3 depicts a graph 300 illustrating a simplified example of the integrated light detected by the integrating detector 104 of FIG. 1, according to an embodiment of the invention. The detector 104 outputs the light intensity detected over a time period of one, indicated by the dotted area 308. The y-axis 304 of the graph 300 represents light intensity as a function of time indicated by the x-axis 302. Over a time period of one, the light detected by the detector 104, represented by the pulse 306, has an intensity of two for half of the time period. Therefore, since the detector 104 is an integrating detector, the detector 104 may output a value of two times one-half, or one.

Referring back to FIG. 1, the controller 106 controls the light-emitting units 102 based on the values stored within the PWM control registers 108. More specifically, the controller 106 turns on the light-emitting units 102 according to different duty cycles based on the values stored within the PWM control registers 108. The controller 106 may be hardware, software, or a combination of hardware and software, and can include both high-level and low-level functionality. As depicted in FIG. 1, the PWM drivers 118 include one controller 106 for controlling all the light-emitting units 102. A red PWM driver may thus be considered as including the red PWM control register 108R and the controller 106, a green PWM driver may be considered as including the green PWM control register 108G and the controller 106, and a blue PWM driver may be considered as including the blue PWM control register 108B and the controller 106. However, there may also be a controller 106 for controlling each of the light-emitting units 102, such that each of the PWM drivers 118 has its own controller, as opposed to sharing a single controller with the other drivers.

The controller 106 sends pulses to the light-emitting units 102 that have duty cycles corresponding to the values stored in the corresponding PWM control registers 108. PWM is a way of digitally encoding analog signal levels. Through the use of high-resolution counters within the controller 106, the duty cycle of a square wave is modulated to encode a specific analog signal level. The PWM signal is still digital because, at any given instant of time, the signal is either fully on or fully off. The signals are supplied to the light-emitting units 102 by a repeating series of on and off pulses. The on time is the time during which an on signal is applied to one of the units 102, whereas the off time is the time during which an off signal is applied to one of the units 102. The duty cycle is the percentage of time over a given period of time that one of the light-emitting units 102 is on. Thus, a duty cycle of 50% means that one of the light-emitting units 102 is turned on for 50% of the time, whereas a duty cycle of 75% means that one of the units 102 is turned on for 75% of the time, and so on. Preferably, the period of time during which any of the light-emitting units 102 is turned on at a duty cycle is at most as long as the period of time over which the detector 104 integratively detects the light emitted by the unit as reflected off the image surface 114.

The controller 106 over successive periods of time turns on successive light-emitting units 102 in accordance with different duty cycles, depending on the values stored within the control registers 108. For example, the controller 106 in the first period of time may turn on the red light-emitting unit 102R at a duty cycle based on the value stored in the red PWM control register 108R. The controller 106 in the second period may turn on the green light-emitting unit 102G at a duty cycle based on the value stored in the green PWM control register 108G. In the third period of time, the controller 106 may turn on the blue light-emitting unit 102B at a duty cycle based on the value stored in the blue PWM control register 108B. Therefore, at any given time, preferably at most one of the light-emitting units 102 is turned on and emitting colored light.

Because the controller 106 is able to control the duty cycle at which each of the light-emitting units 102 emits light during a time period, it can ensure that the effective intensity of light integrated over the time period as detected by the detector 104 is the same or substantially the same for each of the light-emitting units 102. This means that the controller 106 is able to compensate for the light-emitting units 102 outputting their colored light at different intensities. A light-emitting unit that outputs light at a lesser intensity is turned on at a greater duty cycle during a time period than a light-emitting unit that outputs light at a greater intensity, so that the integration of the light over the period of time is the same for both of the light-emitting units. That is, the values stored within the PWM control registers 108 are preferably set so that the integration of the light emitted by the corresponding light-emitting units 102 over a time period are equal to one another.

FIGS. 4 and 5 depict graphs 400 and 500 illustrating a simplified example in which the light-emitting units 102 of FIG. 1 are turned on according to different duty cycles so that their effective emitted light integrated over a period of the time are equal or substantially equal, according to an embodiment of the invention. FIG. 4 specifically depicts the graph 400 in which the controller 106 of FIG. 1 sends pulses to the light-emitting units 102 at duty cycles based on the values stored within the PWM control registers 108 of FIG. 1. FIG. 5 specifically depicts the graph 500 in which the light 110 emitted by the light-emitting units 102 as integrated over a period of time are equal, as controlled by the pulses of the graph 400.

Referring first to FIG. 4, the y-axis 404 of the graph 400 indicates whether the pulse sent by the controller 106 to the light-emitting units 102 is on or off. The x-axis 302 delineates three time periods 406, including a time period 406R in which the red light-emitting unit 102R is controlled, a time period 406G in which the green light-emitting unit 102G is controlled, and a time period 406B in which the blue light-emitting unit 102B is controlled. The time periods 406 are of equal length. The controller 106 sends the red light-emitting unit 102R the pulses 408R having a 100% duty cycle, such that in effect a single pulse is sent having a width equal to the entirety of the time period 406R. During the next period 406G, the controller 106 sends the green light-emitting unit 102G the pulses 408G having a duty cycle of 66.67%, such that the green light-emitting unit 102G is effectively turned on for two-thirds of the period 406G. During the final time period 406B, the controller 106 sends the blue light-emitting unit 102B the pulses 408B having a duty cycle of 50%, such that the blue light-emitting unit 102B is effectively turned on for half of the period 406B. The duty cycles of the pulses 408 correspond to the values stored in the corresponding PWM control registers 108.

Referring next to FIG. 5, the y-axis 304 of the graph 500 indicates the effective intensity of light output by the light-emitting units 102, whereas the x-axis 302 again delineates the three time periods 406 that correspond to the three time periods 406 of FIG. 4. The light-emitting units 102 emit light at intensities consistent with the chart 200 of FIG. 2 that has been described. However, because the duty cycles in which they are turned on differ, all of the light-emitting units 102 ultimately output light at the same effective intensity. During the time period 406R, the red light-emitting unit 102R emits red light 110R at an effective intensity of two. This is because the duty cycle of 100% at which the red unit 102R is turned on, times the intensity of two of the red unit 102R, as indicated by the line 204 in FIG. 2, is equal to two.

During the time period 406G, the green light-emitting unit 102G also emits green light 110G at an effective intensity of two. This is because the duty cycle of 66.67% at which the green unit 102G is turned on, times the intensity of three of the green unit 102G, as indicated by the line 206 in FIG. 2, is equal to two. Finally, during the time period 406B, the blue light-emitting unit 102B also emits blue light 110B at an intensity of two. This is because the duty cycle of 50% at which the blue unit 102B is turned on, times the intensity of four of the blue unit 102B, as indicated by the line 208 in FIG. 2, is equal to two. Thus, the effective light intensities emitted by the light-emitting units 102 as integrated over the corresponding of the time periods 406 are equal, even though the actual light intensities of the light 110 emitted by the light-emitting units 102 differ.

Specific Implementation of Scanning Mechanism

Figure 6:
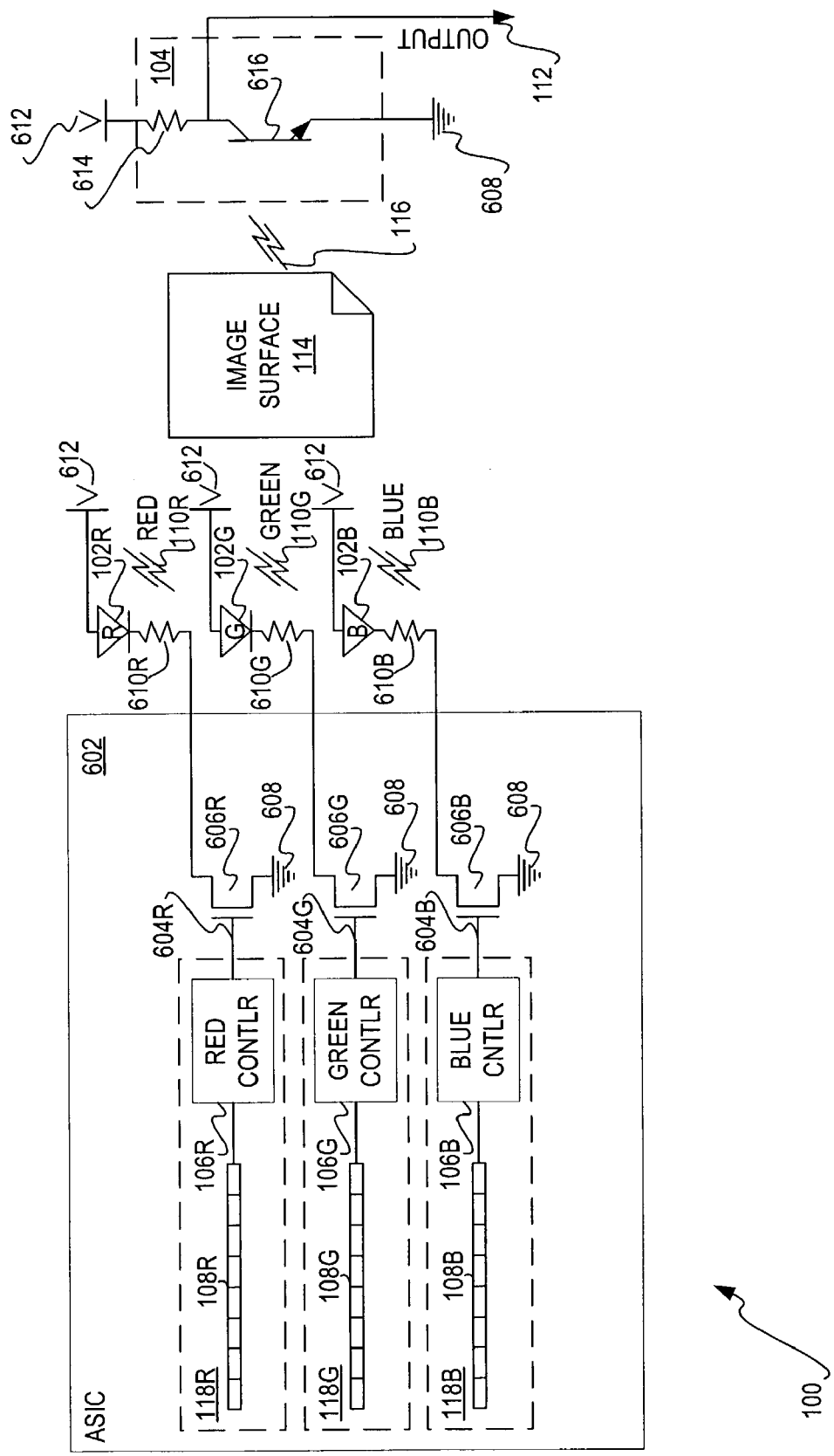
FIG. 6 is a diagram of a specific implementation of the scanning mechanism of FIG. 1, according to an embodiment of the invention.

FIG. 6 shows a specific implementation of the scanning mechanism 100, according to an embodiment of the invention. An application-specific integrated circuit (ASIC) 602, which is one type of integrated circuit (IC), includes the PWM drivers 118. The red PWM driver 118R includes an eight-bit PWM control register 108R, as well as a specific red controller 106R. The green PWM driver 118G includes an eight-bit PWM control register 108G and a green controller 106G, whereas the blue PWM driver 118B includes an eight-bit PWM control register 108B and a blue controller 106B. Thus, whereas the scanning mechanism 100 of FIG. 1 has a single controller 106, the scanning mechanism 100 of FIG. 6 has three separate controllers 106R, 106G, and 106B.

General-purpose input-outputs (GPIO's) 604 are employed to externally connect the PWM drivers 118 with the light-emitting units 102. The GPIO's are one type of input-output (IO). The GPIO's 604 include the GPIO 604R to control the red light-emitting unit 102R, the GPIO 604G to control the green light-emitting unit 102G, and the GPIO 604B to control the blue light-emitting unit 102B. The GPIO's 604 are connected to the gates of the transistors 606 to control the light-emitting units 102 that are connected to the sources of the transistors 606 through the resistors 610. The drains of the transistors 606 are grounded to the ground 608. The transistors 606 include the transistors 606R, 606G, and 606B, and the resistors 610 include the resistors 610R, 610G, and 610B, for the red, green, and blue light-emitting units 102R, 102G, and 102B, respectively.

The light-emitting units 102 are depicted in FIG. 6 as LED's connected to a voltage 612. The resistors 610 may have their values set so that the intensities of the light 110 emitted by the light-emitting units 102 are as equal as possible, such as being nominally equal. The values stored in the PWM control registers 108 can then be varied to fine tune the duty cycles in accordance with which the light-emitting units 102 are turned on during a period of time, so that the light 110 emitted by the units 102 as integrated over the period time are equal or substantially equal. For instance, the resistors 610 may have their values set so that the effective intensities of the light 110 emitted by the light-emitting units 102 are equal for nominal units 102. For a specific instance of the scanning mechanism 100, the values stored in the PWM control registers 108 may then be calibrated so that the light 110 emitted by the light-emitting units 102 as integrated over a period of time are equal or substantially equal.

The light 110 is reflected off the image surface 114, as the reflected light 116, which is detected by the integrating detector 104. The integrating detector 104 is specifically implemented in FIG. 6 as a resistor 614 in series with a BJT 616, the collector of which is coupled to the output 112 and the emitter of which is coupled to the ground 608. The detector 104 is also connected to the voltage 612. The output 112 in FIG. 6 thus outputs an analog value that represents the intensity of the reflected light 116 that is detected. The analog value is more specifically equal to the voltage drop over the BJT 616.

Methods

Figure 7:
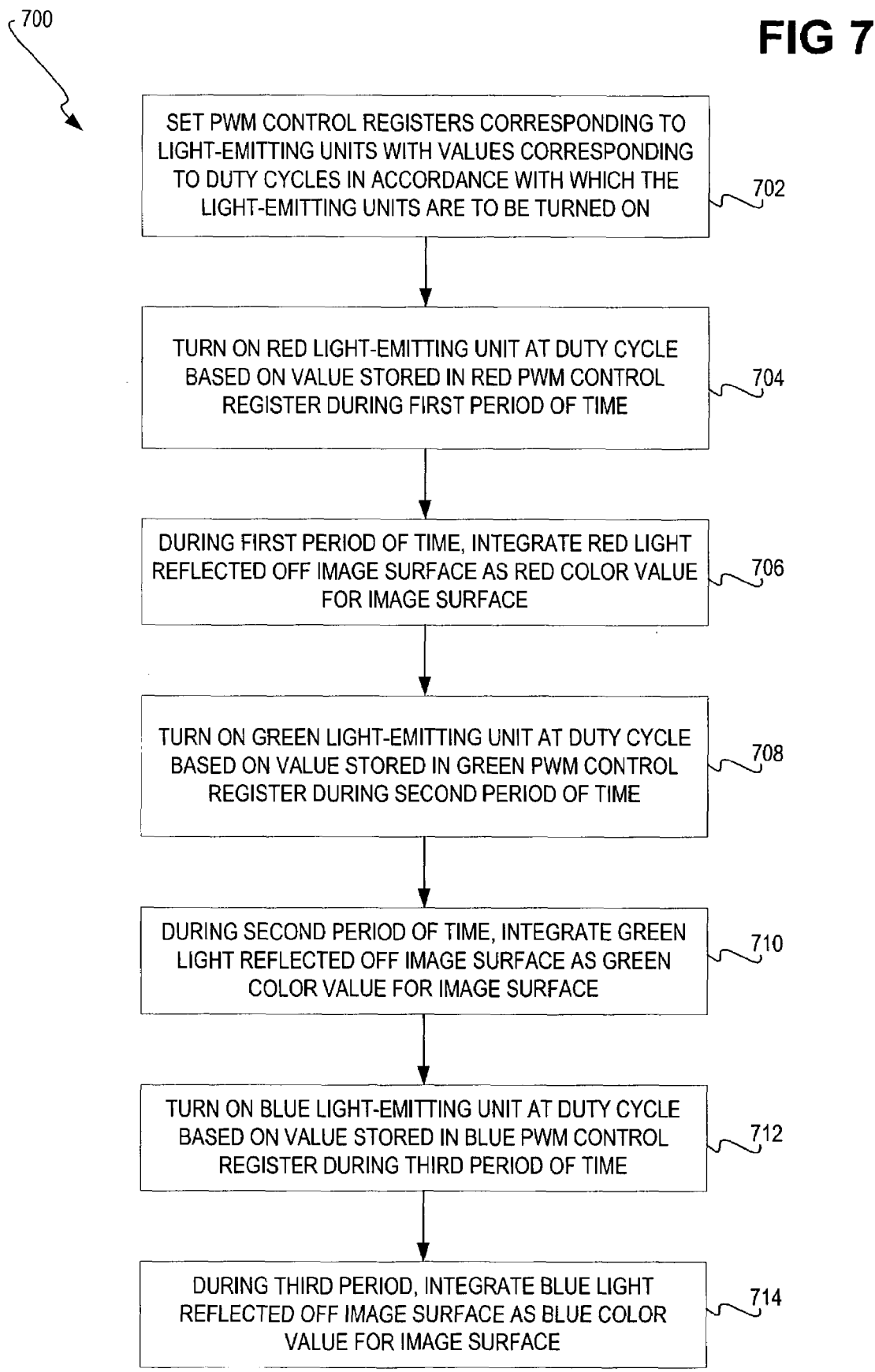
FIG. 7 is a flowchart of a method showing how the scanning mechanism of FIG. 1 may be used, according to an embodiment of the invention.

FIG. 7 shows a method 700 for using the scanning mechanism 100 that has been described in the preceding section of the detailed description, according to an embodiment of the invention. The method 700 is specifically described in relation to the scanning mechanism 100 having light-emitting units 102 corresponding to the red-green-blue (RGB) color space. However, other embodiments of the invention may have light-emitting units 102 corresponding to other color spaces, as can be appreciated by those of ordinary skill within the art. The pulse-width modulated control registers 108 that correspond to the light-emitting units 102 are set with values corresponding to the duty cycles in accordance with which the units 102 are to be turned on during a time period (702). For instance, the control registers 108 may be differently set so that the different intensities of the light-emitting units 102 integrated over the time period as detected by the detector 104 are equal or substantially equal—that is, such that their effective intensities over the time period are equal or substantially equal.

The red light-emitting unit 102R is then first turned on at a duty cycle based on the value stored in the red PWM control register 108R, during a first period of time (704). The red light reflected off an image surface is detected and integrated over the first time period, to yield the red color value, or intensity, for the image surface (706). The green light-emitting unit 102G is next turned on at a duty cycle based on the value stored in the green PWM control register 108G, during a second time period (708), and the green light reflected off the image surface is integrated over the second time period to yield the green color value for the image surface (710). Likewise, the blue light-emitting unit 102B is turned on at a duty cycle based on the value stored in the blue PWM control register 108B during a third time period (712), and the blue light reflected off the image is integrated over the third time period to yield the blue color value for the image surface (714).

Upon completion of the method 700, the red, green, and blue color values for the image surface are obtained. The image surface being scanned in the method 700 may be a pixel of an image, where the method 700 is repeated for all the pixels of the image to yield an electronic version of the complete image. The red, green, and blue color values for the pixels of the image are used, for instance, to display the electronic version of the image on a display device of a computer. The red, green, and blue color values for the image pixels may be converted to another color space, such as the cyan-magenta-yellow-black (CMYK) color space, for outputting the image on media using an image-forming device, such as an inkjet or a laser printer.

Figure 8:
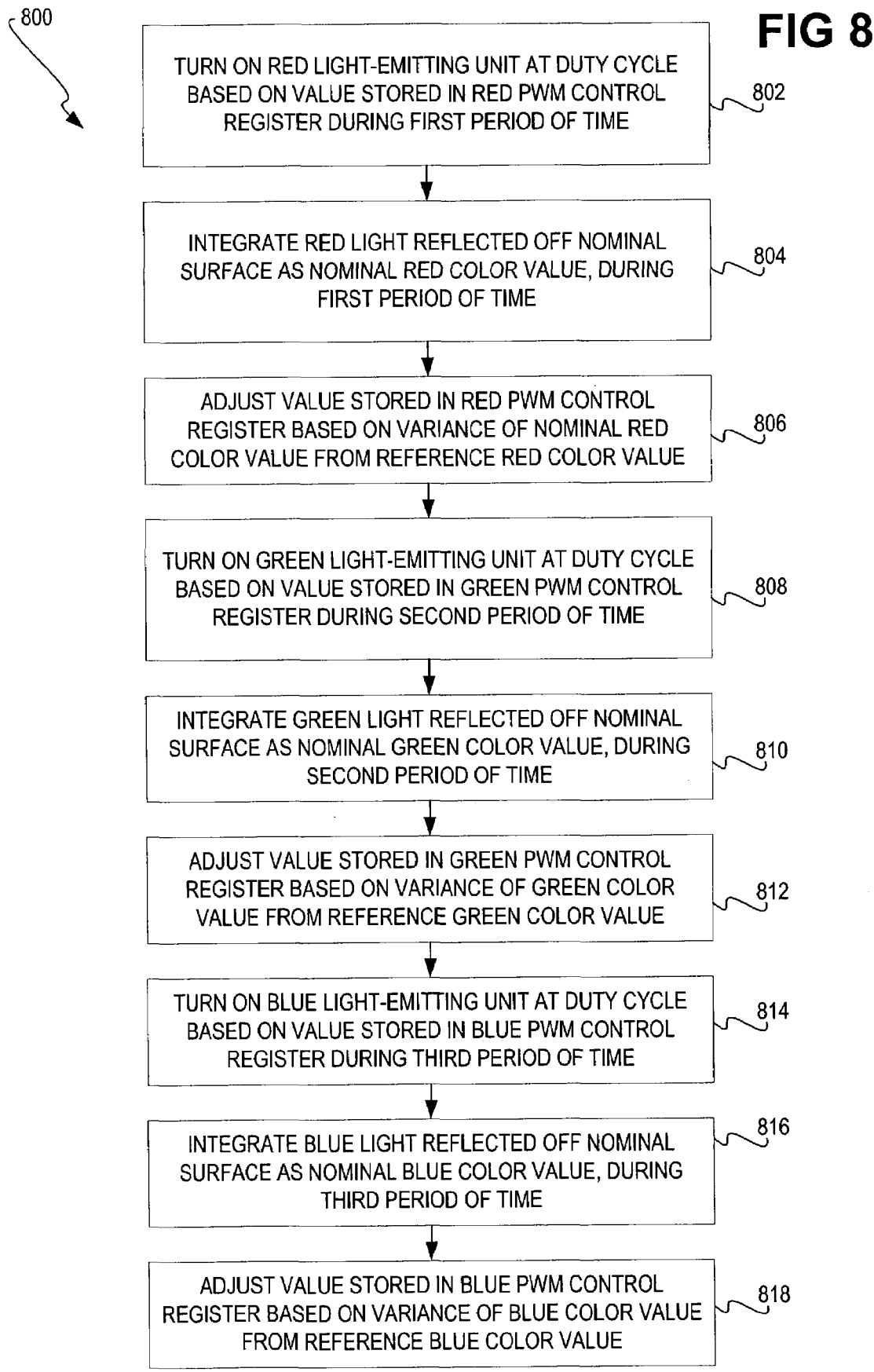
FIG. 8 is a flowchart of a method for calibrating the scanning mechanism of FIG. 1, according to an embodiment of the invention.

FIG. 8 shows a method 800 for calibrating the detecting mechanism 100 that has been described in the preceding section of the detailed description, according to an embodiment of the invention. The method 800 may be performed in 702 of the method 700 of FIG. 7 in one embodiment. The method 800 is specifically described in relation to the scanning mechanism 100 having light-emitting units corresponding to the RGB color space. However, other embodiments of the invention may have light-emitting units corresponding to other color spaces. The method 800 sets the values of the pulse-width modulated control registers 108 that correspond to the light-emitting units 102, where the scanning mechanism 100 turns on the units 102 in accordance with duty cycles based on these values.

The red light-emitting unit 102R is first turned on at a duty cycle based on the initial value stored in the red PWM control register 108R, during a first period of time (802). The red light reflected off a nominal surface is integrated as the nominal red color value, or intensity, during the first period of time (804). The nominal surface may be, for instance, the surface of a calibration media, such as a white sheet of paper, where the red light reflected off this nominal surface is integratively detected by the integrating detector 104. The value stored in the red PWM control register 108R is then adjusted based on the variance of the nominal red color value from a reference red color value (806). The value is adjusted so that the resulting duty cycle based is such that the red light-emitting unit 102R emits red light at an effective detected light intensity equal to the reference red color value, instead of the nominal red color value.

For example, the red light-emitting unit 102R may output red light as detected by the integrating detector 104 on a linear basis as to the duty cycle of its driving pulse. This means that a 10% increase in the duty cycle results in a 10% increase in the red light output by the unit 102R as detected by the integrating detector 104. If the nominal value of the red light output by the red light-emitting unit 102R, as integratively detected by the detector 104, is 120, and the reference red color value is 128, then the duty cycle in accordance with which the unit 102R outputs light is increased by (128−120)/120 percent, or about 7%. The value stored in the red PWM control register 108R is thus increased by 7% so that the red light output by the red unit 102R as detected by the integrated detector 104 off the nominal surface is equal or substantially equal to the reference red color value of 128.

As can be appreciated by those of ordinary skill within the art, the red light-emitting unit 102R may not output red light as detected by the integrating detector 104 on a linear basis as to the duty cycle of its driving pulse. For instance, the output characteristics of the unit 102R, and/or the red light sensing characteristics of the detector 104, may not be linear. In such instances, linearity may nevertheless be presumed, but 802, 804, and 806 reperformed iteratively until the nominal red color value is within a threshold percent of the reference red color value. Alternatively, where the non-linear characteristics of the red light-emitting unit 102R and the detector 104 are known, the adjustment of the value stored in the red PWM control register 108 in 806 may be made based on these non-linear characteristics. Other approaches to adjusting the value stored in the red PWM control register 108 may also be employed.

During a second time period, the green light-emitting unit 102G is then turned on at a duty cycle based on the initial value stored in the green PWM control register 108G (808). The green light reflected off the nominal surface is integrated as the nominal green color value, or intensity, during the second time period (810), and the value stored in the green PWM control register 108G is adjusted based on the variance of the nominal green color value from a reference green color value (812). Likewise, during a third time period, the blue light-emitting unit 102B is turned on at a duty cycle based on the initial value stored in the blue PWM control register 108B (814). The blue light reflected off the nominal surface is integrated as the nominal blue color value, or intensity, during the third time period (816), and the value stored in the blue PWM control register 108B is adjusted based on the variance of the nominal blue color value from a reference blue color value (818).

The reference red, green, and blue color values, the variance of the nominal red, green, and blue color values from which provide the basis for adjusting the values stored in the PWM control registers 108, may be the same value, such as 128. The values stored in the PWM control registers 108 are thus varied so that the duty cycles of the pulses that control the output of the light-emitting units 102 are ultimately set so that the effective red, green, and blue light intensities detected by the integrating detector 104 off the nominal surface are equal or substantially equal. The values in the PWM control registers 108 may be different, based on the different light intensities output by the light-emitting units 102, as well as the differences with which the integrating detector 104 senses light of different colors. Calibration of the sensing mechanism 100 by performing the method 800 compensates for such differences among the light-emitting units 102 and within the integrating detector 104.

Scanning Device

Figure 9:
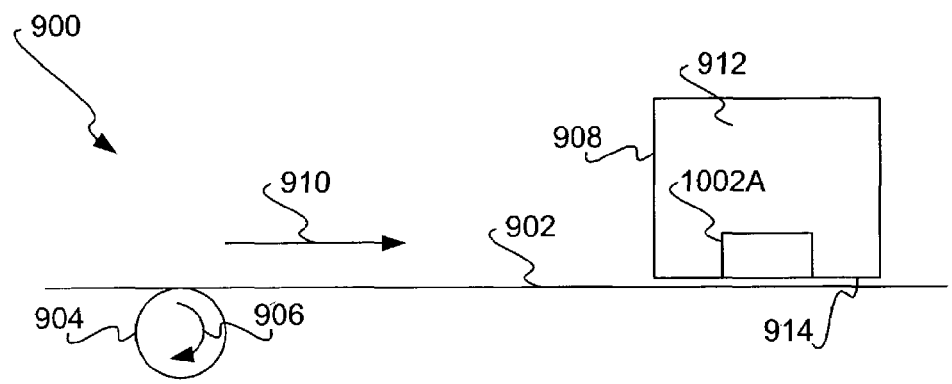
FIG. 9 is a diagram of a side view of a scanning device including one or more instances of the scanning mechanism of FIG. 1, according to an embodiment of the invention.
Figure 10:
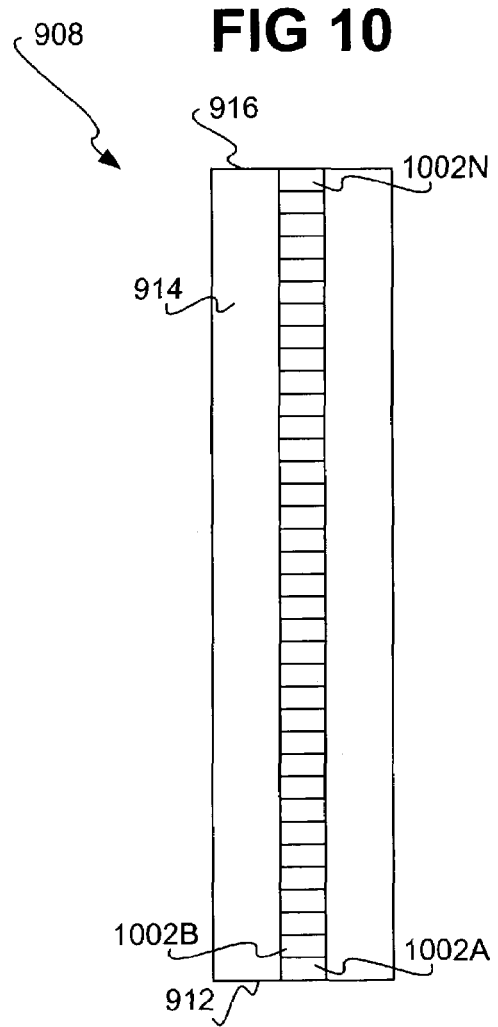
FIG. 10 is a diagram of a bottom view of a mounting mechanism of the scanning device of FIG. 9, according to an embodiment of the invention.

FIG. 9 shows a side view of a scanning device 900 having a mounting mechanism 908, and FIG. 10 shows a bottom view of the mounting mechanism 908 in detail, according to an embodiment of the invention. Referring first to FIG. 9, the scanning device 900 includes a roller shaft 904 and the mounting mechanism 908. As can be appreciated by those of ordinary skill within the art, the scanning device 900 may include other components in addition to and/or in lieu of those depicted in FIG. 9. The scanning device 900 may be a stand-alone scanner, a part of a multi-function device (MFD) also including, for instance, printing and/or faxing functionality, and so on.

The roller shaft 904 rotates clockwise, as indicated by the arrow 906. This causes the media 902 to move from left to right, as indicated by the arrow 910, under the mounting mechanism 908. The roller shaft 904 is more generally an advance mechanism that advances the media over its length relative to the mounting mechanism 908. The mounting mechanism 908 has a front surface 912 and a bottom surface 914. The mounting mechanism 908 includes a number of scanning mechanisms situated at the bottom surface 914, a particular scanning mechanism 1002A of which is visible in FIG. 9. The mounting mechanism 908, and hence the scanning mechanisms, are stationary in FIG. 9, whereas the media 902 is physically advanced thereunder. Alternatively, the mounting mechanism 908 may physically advance past the media 902, which may be stationary.

Referring to FIG. 10, the bottom surface 914 of the mounting mechanism 908 is depicted as include the scanning mechanisms 1002A, 1002B, . . . , 1002N, which are collectively referred to as the scanning mechanisms 1002. The scanning mechanisms extend from the front surface 912 of the mounting mechanism 908 to a back surface 916 of the mounting mechanism 908. Each of the scanning mechanisms 1002 may be implemented as the scanning mechanism 100 that has been described in the preceding sections of the detailed description, such that the previously provided description of the scanning mechanism 100 is applicable to the scanning device 900 as well. Preferably, the scanning mechanisms 1002 correspond to the width of the media 902 of FIG. 9.

The scanning device 900 operates as follows. As the media 902 is moved from left to right, a single media width of pixels of the media 902 is disposed under the scanning mechanisms 1002 of the mounting mechanism 908 at any given time. That is, a portion, such as a single pixel, of the media 902 is disposed under each of the scanning mechanisms 1002 at any given time. The scanning mechanisms 1002 may emit red, green, and blue light onto their corresponding pixels, and may detect the reflected red, green, and blue light as the red, green, and blue color values, or intensities, of these pixels. Therefore, as the media 902 is moved from left to right, the scanning mechanisms 1002 completely scan the media 902, realizing an electronic version of the image present on the media 902.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A scanning mechanism comprising:
   a plurality of light-emitting units to each emit colored light;
   a detector to measure a plurality of intensities of the colored light emitted by the plurality of the light-emitting units; and,
   a plurality of pulse-width modulated (PWM) drivers, each of the plurality of the PWM drivers to turn on a corresponding one of the plurality of the light-emitting units at a duty cycle based on a difference between corresponding ones of the plurality of the intensities of the colored light measured and a plurality of reference light intensities.

2. The scanning mechanism of claim 1, wherein the plurality of light-emitting units comprise a plurality of light-emitting diodes (LED's).

3. The scanning mechanism of claim 1, wherein the plurality of light-emitting units comprise a red light-emitting unit, a green light-emitting unit, and a blue light-emitting unit, corresponding to red, green, and blue colors of a red-green-blue (RGB) color space.

4. The scanning mechanism of claim 1, wherein the plurality of light-emitting units comprise a white light-emitting unit, corresponding to a white color of a grayscale color space.

5. The scanning mechanism of claim 1, wherein the plurality of PWM drivers turn on corresponding ones of the plurality of the light-emitting units during different periods of time, such that at any time at most one of the light-emitting units is emitting light.

6. The scanning mechanism of claim 1, wherein the plurality of PWM drivers turn on corresponding ones of the plurality of the light-emitting units at the duty cycles such that ones of the plurality light-emitting units output the colored light at equal effective intensities over a period of time.

7. The scanning mechanism of claim 1, wherein each of the plurality of the PWM drivers comprises:
   a control register storing a value corresponding to the duty cycle in accordance with which a corresponding one of the plurality of the light-emitting units is to emit light; and,
   a transistor interfacing the control register to the corresponding light-emitting unit.

8. The scanning mechanism of claim 7, wherein the PWM driver outputs pulses having a duty cycle corresponding to the value stored by the control register.

9. The scanning mechanism of claim 7, wherein the plurality of PWM drivers comprise at least one controller to turn on the light-emitting units at the duty cycles based on the values stored by the control registers.

10. The scanning mechanism of claim 9, wherein the at least one controller comprises one controller controlling all the light-emitting units.

11. The scanning mechanism of claim 9, wherein the at least one controller comprises a plurality of controllers corresponding to the plurality of light-emitting units.

12. The scanning mechanism of claim 1, further comprising an integrated circuit (IC) within which the PWM drivers are implemented.

13. The scanning mechanism of claim 12, wherein each driver is communicatively connected to an input/output (IO) of the IC, such that the light-emitting unit corresponding to the driver is also communicatively connected to the IO of the IC.

14. The scanning mechanism of claim 13, wherein the IO comprises a general-purpose IO (GPIO).

15. The scanning mechanism of claim 12, wherein the IC comprises an application-specific IC (ASIC).

16. A scanning mechanism comprising:
a plurality of light-emitting units to emit colored light;
a detector to measure a plurality of intensities of the colored light emitted by the plurality of the light-emitting units as reflected off a surface; and,
means for turning on ones of the plurality of the light-emitting units at duty cycles based on a variance between corresponding ones of the plurality of the intensities of the colored light measured and a plurality of reference light intensities.

17. The scanning mechanism of claim 16, wherein the means comprises, for each light-emitting unit, a control register storing a value corresponding to the duty cycle in accordance with which the corresponding light-emitting unit is to emit light.

18. The scanning mechanism of claim 16, wherein the means comprises an integrated circuit (IC).

19. A scanning device comprising:
a plurality of scanning mechanisms corresponding to a width of media, each scanning mechanism for scanning a portion of the width of the media by successively turning on a plurality of light-emitting units corresponding to colors of a color space at different duty cycles; and,
an advance mechanism to advance the media over a length of the media relative to the plurality of scanning mechanisms such that the plurality of scanning mechanisms scan the length of the media.

20. The scanning device of claim 19, wherein each scanning mechanism comprises a plurality of pulse-width modulated (PWM) drivers to turn on the light-emitting units at the different duty cycles.

21. The scanning device of claim 19, wherein each scanning mechanism comprises an integrating detector to detect colored light emitted by the light-emitting units as reflected off the portion of the width of the media over the period of time.

22. The scanning device of claim 19, wherein each scanning mechanism generates a plurality of pulses corresponding to the plurality of light-emitting units having the different duty cycles.

23. The scanning device of claim 19, wherein the advance mechanism physically advances the media past the plurality of scanning mechanisms, which are stationary.

24. The scanning device of claim 19, wherein the advance mechanism physically advances the plurality of scanning mechanisms past the media, which is stationary.

25. The scanning device of claim 19, wherein the scanning device is a stand-alone scanner.

26. The scanning device of claim 19, wherein the scanning device is part of a multi-function device (MFD).

27. A method comprising:
turning on a light-emitting unit for a period of time according to a duty cycle based on a value stored in a control register;
detecting an effective light intensity of light emitted by the light-emitting unit as reflected off a nominal surface; and,
adjusting the value stored in the control register based on a variance between the effective light intensity and a reference light intensity.

28. The method of claim 27, further comprising:
during each of a number of successive periods of time equal to a number of additional of the light-emitting units, turning on one of the additional the light-emitting unit for a period of time according to a duty cycle based on a value stored in a corresponding one of additional of the control register;
detecting an effective light intensity of light emitted by the one of the additional of the light-emitting unit as reflected off a nominal surface; and
adjusting the value stored in the corresponding one of the additional of the control register based on a variance between the effective light intensity and a reference light intensity corresponding to the one of the additional of the light-emitting unit.

* * * * *